(12) United States Patent
Whitehead et al.

(10) Patent No.: US 7,680,273 B2
(45) Date of Patent: Mar. 16, 2010

(54) SYSTEM AND METHOD FOR OPTIMIZING ERROR DETECTION TO DETECT UNAUTHORIZED MODIFICATION OF TRANSMITTED DATA

(75) Inventors: David E. Whitehead, Pullman, WA (US); Allen D. Risley, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1372 days.

(21) Appl. No.: 11/006,850

(22) Filed: Dec. 8, 2004

(65) Prior Publication Data

US 2006/0120521 A1    Jun. 8, 2006

(51) Int. Cl.
H04L 9/00    (2006.01)
(52) U.S. Cl. .................................................. 380/46
(58) Field of Classification Search ................. 380/268, 380/277, 44, 46, 28, 45, 47
See application file for complete search history.

(56) References Cited

U.S. PATENT DOCUMENTS

| | | | |
|---|---|---|---|
| 4,754,482 A | | 6/1988 | Weiss |
| 5,054,068 A | * | 10/1991 | Hess et al. .................. 380/270 |
| 6,212,662 B1 | | 4/2001 | Hekstra et al. |
| 7,216,043 B2 | | 5/2007 | Ransom et al. |
| 7,224,796 B2 | * | 5/2007 | Watanabe et al. ............. 380/46 |
| 7,389,357 B2 | * | 6/2008 | Duffie et al. ................. 709/235 |
| 2001/0052072 A1 | * | 12/2001 | Jung .......................... 713/160 |
| 2002/0003881 A1 | * | 1/2002 | Reitmeier et al. ........... 380/210 |
| 2005/0005093 A1 | | 1/2005 | Bartels et al. |
| 2005/0175182 A1 | * | 8/2005 | Ueno et al. .................. 380/277 |

OTHER PUBLICATIONS

Roberts, Lawrence G., Picture Coding Using Psuedo-Random Noise.

* cited by examiner

*Primary Examiner*—Beemnet W Dada
(74) *Attorney, Agent, or Firm*—Eugene M. Cummings, P.C.

(57) ABSTRACT

Disclosed is a system and method for optimizing error detection to detect unauthorized modification of transmitted data. The system includes an encrypting device and a decrypting device operatively coupled to the first encrypting device. The encrypting device is configured to re-order and encrypt a first data stream to form a second data stream, and the decrypting device is configured to re-order and decrypt the second data stream to form a third data stream substantially identical to the first data stream. Each of the encrypting and decrypting devices includes at least one pseudo-random number generator, a reversible function device responsive to a first pseudo-random number generator to cause data stream bits to be re-ordered, and a XOR function responsive to a second or the first pseudo-random number generator to cause either consecutive portions of the data stream bits to be encrypted or decrypted.

34 Claims, 6 Drawing Sheets

SYSTEM AND METHOD FOR OPTIMIZING ERROR DETECTION TO DETECT UNAUTHORIZED MODIFICATION OF TRANSMITTED DATA

FIELD OF THE INVENTION

The present invention relates generally to data encryption and decryption schemes, and more particularly, to a system and method for optimizing error detection to detect unauthorized modification of transmitted data.

BACKGROUND OF THE INVENTION

Data encryption and decryption schemes, or cryptographic algorithms (a.k.a., ciphers), are well known. Data encryption generally includes concealing the meaning and/or content of data transmitted between a data source and one or more data destination(s), from unauthorized access by eavesdroppers (e.g., adversaries, attackers, interceptors, interlopers, intruders, opponents, or enemies). Data requiring encryption may include financial transaction data, military data, etc. Many data encryption/decryption schemes further include an authentication, integrity and non-repudiation process to establish, usually by challenge and response, that a data transmission attempt is authorized and valid, that the data has not been modified in transit and that the data was actually sent by the sender. That is, the authentication, integrity and non-repudiation process makes it possible for the receiver of the transmitted data to ascertain the data origin to ensure that it originated from an authorized data source or sender.

Modern encryption/decryption schemes use encryption keys to encrypt and decrypt data. In some cases, the encryption keys are random-bit strings generated by some automatic process. Encryption/decryption schemes may be based on either a symmetric algorithm where an encryption key can be calculated from the decryption key, and vice versa, or an asymmetric algorithm, or public-key algorithm, where the encryption key cannot generally be calculated from the decryption key. Symmetric algorithms can be further divided into two categories; stream algorithms that operate on the data one bit (or sometimes byte) at a time, and block algorithms that operate on the data in groups of bits called blocks. Stream cipher coding using stream algorithms is generally considered more secure than block cipher coding using block algorithms. During operation of a symmetric algorithm, unencrypted data, or plaintext, is encrypted at the sending end to form ciphertext. Conversely, at the receiving end, the ciphertext is decrypted to form the original plaintext.

Most users of data encryption/decryption schemes utilize a standardized, well known, underlying communications protocol that is independent of the encryption/decryption schemes. For example, a symmetric algorithm may be used to encrypt data that has been configured using a protocol based on the IEEE 802.3 Ethernet standard. These communication protocols often utilize error detection and correction techniques (e.g., cyclic redundancy check (CRC), checksum) that allow the receiving device to determine when data (e.g., a decrypted data packet) has been corrupted during transmission, and to then discard the corrupted data. These error detection techniques are designed to reliably detect data inadvertently corrupted due to, for example, bursts of additive white Gaussian noise. They are not designed to necessarily detect malicious activity.

Unfortunately, data formatted into data packets having well-known communication protocol structures may be determined by inspection, even when the data is encrypted. For example, some communication protocols use delay delimited frames where a data packet is considered terminated when the data transmitter has not transmitted data for a predetermined period of time. When not transmitting data packets, the data transmitter is said to be idle. If an eavesdropper intercepts ciphertext configured using the delay delimited protocol, the eavesdropper may be able to discern the beginning and end of a data packet by detecting the idle time between packets.

An eavesdropper may alter the contents of one or more encrypted data packets such that the alteration goes undetected by error detection techniques. Such an alteration is achieved when the eavesdropper intercepts the ciphertext, and using "reverse engineering" methods, is able to correctly alter the CRC portion of the data packet to match malicious alteration of another portion of the data packet so that a receiving device does not detect the alteration when performing error detection on the plaintext generated by a decryptor.

Although there are a number of "hacking" methods used by an eavesdropper, one method commonly used involves knowledge of a portion of the plaintext and calculation of the random number sequence used to encrypt that portion of the plaintext (i.e., a known-plain attack). Having knowledge of a portion of the plaintext allows the eavesdropper to decrypt the associated ciphertext to determined the random number sequence, alter the plaintext, determine the new CRC field, and then re-encrypt the altered plaintext with the determined random number sequence to form altered ciphertext. Upon receiving the altered ciphertext, the decryptor converts it to plaintext and forwards the plaintext to the receiving device where no errors are detected using its error detection technique. In this way an eavesdropper is able to introduce altered data into the receiver that may cause damage to the system connected to the receiving device.

To perform a known-plaintext attack, the eavesdropper calculates the random number sequence, or encryption stream, from the ciphertext. This may be accomplished by inspecting each data packet of the ciphertext to determine a structure known to be consistent with a fixed content data packet. For example, a communication protocol may use a well known fixed-content data packet to enable some functionality in the receiving device, where the contents of the fixed-content data packet transmitted at a first time are identical to the contents of the fixed-content data packet transmitted at a second time, third time, etc. By monitoring ciphertext and looking for specific data packets having the discerned length of the fixed-content data packet, the eavesdropper calculates the encryption stream by XORing the encrypted fixed-content data packet with the known, fixed contents of the data packet. After calculating the encryption stream, the eavesdropper can alter the data packet as described above or the eavesdropper can construct an entirely different type of data packet, selected to cause maximum damage to the system connected to the receiving device.

SUMMARY OF THE INVENTION

According to an aspect of the invention, there is provided a system for optimizing error detection to detect unauthorized modification of transmitted data. The system includes an encrypting device and a decrypting device operatively coupled to the first encrypting device. The encrypting device is configured to re-order and encrypt a first data stream to form a second data stream, and the decrypting device is configured to re-order and decrypt the second data stream to form a third data stream substantially identical to the first data stream.

In an embodiment, the first encrypting device includes a first pseudo-random number generator, a second pseudo-random number generator, a first reversible function device operatively coupled to and responsive to the first pseudo-random number generator to re-order the first data stream to form a re-ordered data stream, and a first XOR function operatively coupled to and responsive to the second pseudo-random number generator to encrypt the re-ordered data stream to form the second data stream. The decrypting device includes a third pseudo-random number generator, a fourth pseudo-random number generator, a second XOR function operatively coupled to and responsive to the third pseudo-random number generator to decrypt the second stream to form a decrypted data stream, and a second reversible function device operatively coupled to and responsive to the fourth pseudo-random number generator to re-order the decrypted data stream to form the third data stream.

In another embodiment, the encrypting device includes a first pseudo-random number generator, a first reversible function device operatively coupled to the first pseudo-random number generator and responsive to a first random number stream generated by the first pseudo-random number generator to re-order the first data stream to form a re-ordered data stream, and a first XOR function operatively coupled to the first pseudo-random number generator and responsive to a second random number stream generated by the first pseudo-random number generator to encrypt the re-ordered data stream to form the second data stream. The decrypting device includes a second pseudo-random number generator, a second XOR function operatively coupled to the second pseudo-random number generator and responsive to a third random number stream generated by the second pseudo-random number generator to decrypt the second data stream to form a decrypted data stream, and a second reversible function device operatively coupled to the second pseudo-random number generator and responsive to a fourth random number stream generated by the second pseudo-random number generator to re-order the decrypted data stream to form the third data stream.

The first reversible function device is configured to apply a first function and the second reversible function device is configured to apply a second function where application of the second function reverses a result from application of the first function. In an embodiment, application of the first function results in a random bit-rotation of at least one bit of a portion of the data stream. In another embodiment application of the first function results in random bit reordering of at least one bit of a portion of the data stream.

According to another aspect of the invention, there is provided a method for optimizing error detection to detect unauthorized modification of transmitted data provided by an encrypting device to a decrypting device, the encrypting device including a first microcontroller having a first microprocessor and a first memory operatively coupled to the first microprocessor, the decrypting device including a second microcontroller having a second microprocessor and a second memory operatively coupled to the second microprocessor. The method includes causing the encrypting device to re-order and encrypt a first data stream to form a second data stream, and causing the decrypting device to decrypt and re-order the second data stream to form a third data stream substantially identical to the first data stream.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the figures in which like reference numerals identify like elements, and in which:

DESCRIPTION OF THE PREFERRED EMBODIMENTS

According to an aspect of the invention, the described shortcomings of prior art encryption systems may be overcome by re-ordering data of a transmitted data stream either before or after encryption. Reordering is the act of altering the location of bits, bytes, or other portions of data within the packetized data of the transmitted data stream.

Figure 1:
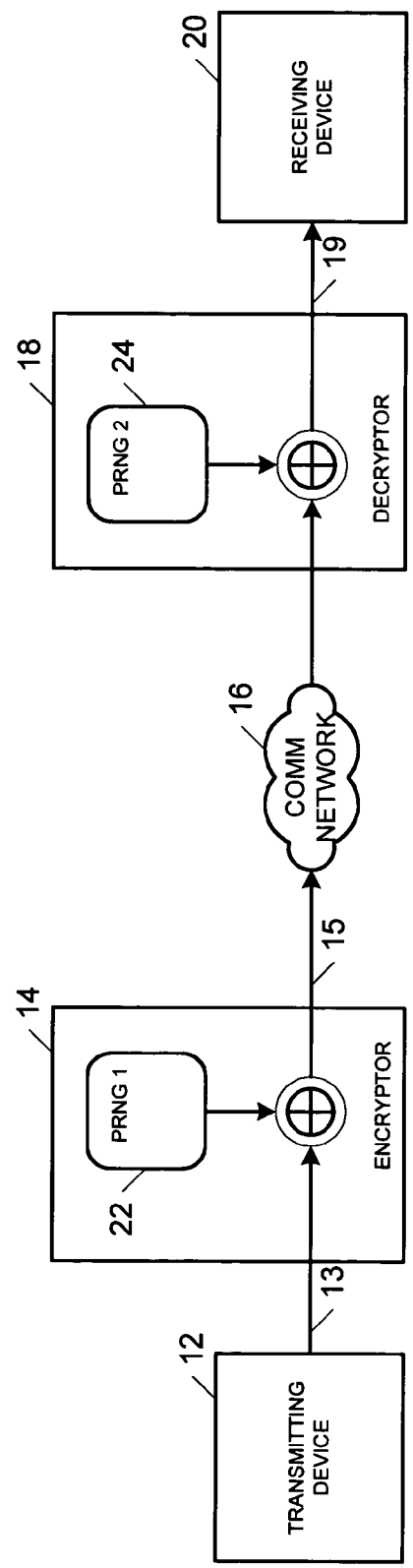
FIG. 1 is stream cipher system for encoding and decoding a stream of data.

As previously mentioned, symmetric algorithms utilize an encryption key that can be calculated from the decryption key, and vice versa. One well known symmetric algorithm uses synchronized pseudo-random number generators to generate apparently random numbers based on a key-generation algorithm. In this case, the key is generally used to set the initial state of the synchronized pseudo-random number generators. For example, FIG. 1 is stream cipher system 10 utilizing a symmetric algorithm to encode and decode a flow of data (data stream) using random numbers in an exclusive-OR (XOR) operation. The stream cipher system 10 includes a transmitting device 12 configured to transmit unencrypted data, or plaintext 13, an encryptor 14 operatively coupled to the transmitting device 12 configured to encrypt or cipher the data to form ciphertext 15, a communications network 16 operatively coupling the encryptor 14 to a decryptor 18 and configured to transmit the cipher text 15, a decryptor 18 configured to decrypt the ciphertext to form the original plaintext 19, and a receiving device 20 operatively coupled to the decryptor 18 and configured to receive the original plaintext 19.

During operation, the encryptor 14 performs a XORing function on (XORs) the unencrypted input data stream, or plaintext 13, received from the transmitting device 12 with a stream of random numbers generated by a first synchronized pseudo-random number generator 22 to produce the ciphertext 15. The ciphertext 15 is formatted according to some well known underlying communications protocol, such as Ethernet. The ciphertext 15 is then transmitted to the decryptor 18. The decryptor 18 XORs the ciphertext 15 with a stream of random numbers generated by a second synchronized pseudo-random number generator 24 to produce the original plaintext 19. This is a result of the XORing function and the synchronized random number generators where XORing any value with the same binary bit twice restores the binary bit to its original value. Accordingly, symmetric algorithms utilizing synchronized pseudo-random number generators rely on the synchronization of the first and second pseudo-random number generators 22, 24, to produce identical streams of random numbers so that the XOR function of the decryptor cancels the effect of the XOR function of the encryptor, thereby reconstructing the original plaintext.

Delay delimited protocols may also be used to configure the data stream provided to an encryptor. In that case, the transmitting device 12 transmits data using a delayed delimited protocol such that idle time is introduced between the data packets. The unencrypted data packets having idle time there between are then encrypted by the encryptor 14 to form ciphertext. As mentioned above, an eavesdropper may then be able to intercept the ciphertext and determine where data packets begin and end based to the idle time between data packets of ciphertext.

After an eavesdropper has discerned the beginning and end of a data packet, it may be possible to reverse engineer the associated encrypted data to determine the function of certain bits or bytes in the data packet. For example, from knowledge of the well-known protocol, the eavesdropper may discern that the last two bytes of the encrypted protocol data packet are the CRC field, even though the contents of the field or any other portion of the data packet are unknown in ciphertext form.

As mentioned above, typically steaming ciphers do not alter the ability of an error detection technique to detect errors. For example, referring again to FIG. 1, assume data, packetized using a well known communications protocol, is encrypted to form ciphertext 15, and transmitted. Assume also, that during transmission, the ciphertext 15 is corrupted by noise in the communication network 16 and therefore the data received by the decryptor 18 is not the same as the data transmitted by the encryptor 14. Upon receipt of the ciphertext, the decryptor 18 faithfully applies the XOR function to decrypt the ciphertext. Because the ciphertext is corrupted by noise, the plaintext 19 resulting from operation of the decryptor 18 does not match the plaintext 13 originally received by the encryptor 14. The plaintext 19 resulting from operation of the decryptor 18 is then further processed by the receiving device 20 to check for errors. Corrupted data packets are then discarded. Accordingly, the types of error detection techniques employed by well known communication protocols are effective at detecting corrupted data when the corruption is of a type expected (e.g., additive white Gaussian noise) by the designer of the error detection technique. Unfortunately, standard error detection techniques may not be effective in differentiating between a "normal" type of data corruption and an "abnormal" type of data corruption such as corruption due to an eavesdropper attempting a ciphertext-only attack, a known-plaintext attack, a chosen-plaintext attack, a adaptive-chosen-plaintext attack, or a chosen-ciphertext attack, to name a few. Thus, data encrypted and decrypted using symmetric algorithms may be vulnerable to malicious attacks by eavesdroppers.

Figure 2:
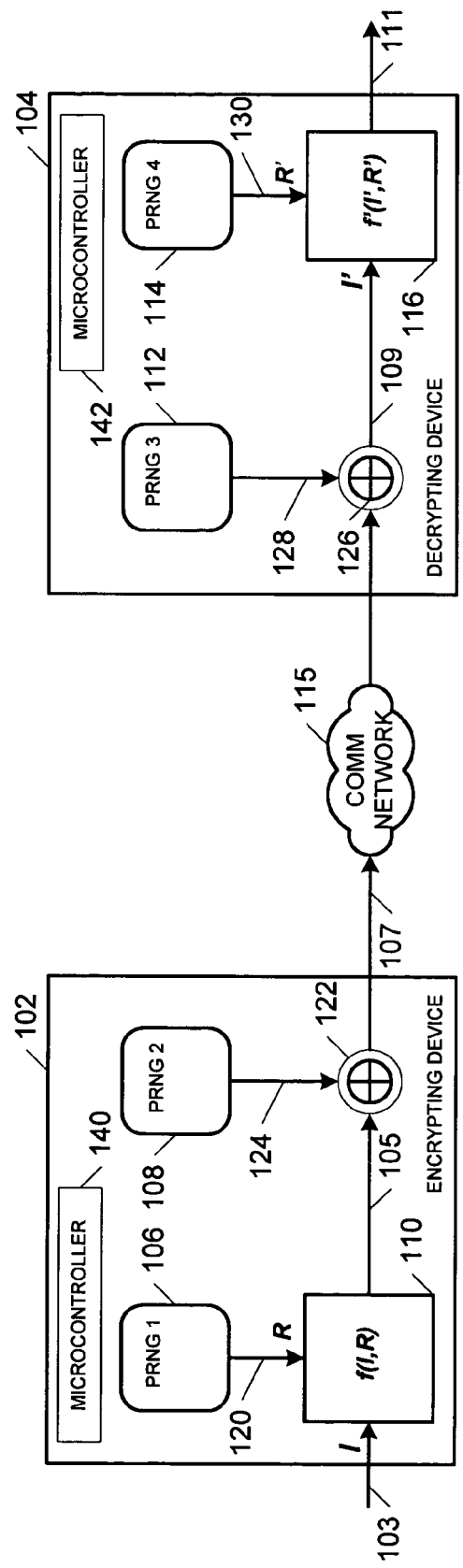
FIG. 2 is an exemplary stream cipher system for encoding and decoding a stream of data according to an embodiment of the invention.

FIG. 2 is stream cipher system 100 for encoding and decoding a stream of data according to an embodiment of the invention. The stream cipher system 100 includes an encrypting device 102 for encrypting data configured via one of any number of well known communication protocols, and a decrypting device 104 for decrypting the data. The decrypting device 104 and encrypting device 102 are operatively coupled to each other via a communication network 115. The communication network 115 may be configured in one of any number of suitable configurations using one or more suitable communication protocols and therefore may include one or more wire line or wireless communication configurations (e.g., Ethernet, the Internet, cellular infrastructure).

The encrypting device 102 includes a first pseudo-random number generator 106, a second pseudo-random number generator 108, and a first reversible function device 110 operatively coupled to and responsive to operation of the first pseudo-random number generator 106. The decrypting device 104 includes a third pseudo-random number generator 112, a fourth pseudo-random number generator 114, and a second reversible function device 116 operatively coupled to and responsive to operation of the fourth pseudo-random number generator 114. Operation of the first pseudo-random number generator 106 is synchronized to operation of the fourth pseudo-random number generator 114, and operation of the second pseudo-random number generator 108 is synchronized to operation of the third pseudo-random number generator 112.

During operation of the stream cipher system 100, a data stream 103 (i.e., plaintext) applied to the encrypting device 102 is received by the first reversible function device 110 where a function shown as $f(I,R)$, hereinafter function $f$, is applied. The function $f$ is configured to rearrange the data bits of the data stream 103 to form a scrambled, or re-ordered data stream 105 using a first random number stream 120 generated by the first pseudo-random number generator 106. Application of the function $f$ to the unencrypted data stream 103 prevents a would-be eavesdropper from discerning data locations of the subsequent transmitted ciphertext.

In order to apply the function $f$, a first microcontroller 140, operatively coupled to the first pseudo-random number generator 106, the second pseudo-random number generator 108, the first reversible function device 110 and a first XOR function 122, causes a first present value (i.e., a first number) of the first random number stream 120 provided by the first pseudo-random number generator 106 to be stored in a register or memory of the first microcontroller 140. The first microcontroller 140 also causes a first portion of the data stream 103 to be stored in the register or memory. Upon storage completion of the first present value of the first random number stream 120 and the first portion of the data stream 103, the first microcontroller 140 causes some or all of the bits of the first portion of the data stream 103 to be re-ordered based on the first present value of the first random number stream 120 to form a first portion of the re-ordered data stream 105. The steps of saving and re-ordering similarly continue on subsequent portions of the data stream 103.

Referring again to FIG. 2, after the unencrypted data stream 103 is re-ordered by the function $f$ to form the re-ordered data stream 105, the re-ordered data stream 105 is encrypted by XORing it, via the first XOR function 122, with a second random number stream 124 generated by the second pseudo-random number generator 108 to form an encrypted data stream 107 (i.e., ciphertext). The encrypted data stream 107 is then transmitted via the communications network 115 to the decrypting device 104.

When received by the decrypting device 104, the encrypted data stream 107 is decrypted by XORing it, via a second XOR function 126, with a third random number stream 128 generated by the third pseudo-random number generator 112 to form a decrypted data stream 109 substantially identical to the re-ordered data stream 105.

Next, the decrypted data stream 109 is received by the second reversible function device 116 where a reverse function shown as $f'(I', R')$, hereinafter reverse function $f'$, is applied to the decrypted data stream 109. The reverse function $f'$ is configured to rearrange the data bits of the decrypted data stream 109 to form a restored data stream 111 substantially identical to the data stream 103 using a fourth random number stream 130 generated by the fourth pseudo-random number generator 114. In other words, the reverse function f' is configured as the reverse of the function f such that application of the second reversible function device 116 effectively reverses the results from application of the first reversible function device 110 so that the output of the second reversible function device 116 is substantially identical to the input of the first reversible function device 110.

In order to apply the reverse function f', a second microcontroller 142, operatively coupled to the third pseudo-random number generator 112, the fourth pseudo-random number generator 114, the second reversible function device 116 and the second XOR function, causes a first present value of the fourth random number stream 130 generated by the fourth pseudo-random number generator 114 be stored in a register or memory of the second microcontroller 142. The second microcontroller 142 also causes a first portion of the decrypted data stream 109 to be stored in the register or memory. Upon storage completion of the first present value of the fourth random number stream 130 and the first portion of the decrypted data stream 109, the second microcontroller 142 causes some or all of the bits of the first portion of the decrypted data stream 109 to be re-ordered based on the first present value of the fourth random number stream 130 to form a first portion of the restored data stream 111. The steps of saving and re-ordering similarly continue on subsequent portions of the decrypted data stream 109.

The data bits of the data stream 103 may be re-ordered by the function f in one of any number of suitable groupings and patterns as long as its reverse function f' can be applied to the decrypted data stream 109 to form a restored data stream 111 that is substantially identical to the data stream 103 and as long as the groupings and patterns comport with the underlying communication protocol. For example, the function f may cause the stored data bits from the unencrypted data stream 103 to be right bit-rotated by a number of bit positions determined by the stored present value of the first random number stream 120 from the first pseudo-random number generator 106. Illustrating, if the predetermined number of data bits from the data stream 103 are expressed as a first binary string 1000101010111, and the stored present value from the first random number stream 120 is decimal 3, the first reversible function device 110 operates to right bit-rotate the binary string, three-positions, to form a second bit string 111000101010, appearing as the re-ordered data stream 105. Assuming no data corruption, when encrypted, decrypted and subject to operation of the second reversible function device 116, the data will be again re-ordered to its original order of 1000101010111.

Although illustrated using a right bit-rotation pattern, other bit-rotation patterns may be used. Moreover, although illustrated using a 12-bit segment of the data stream 103, other bit segments having a different number of bits may be used (e.g., two bytes). Similarly, although illustrated with participation of all of the bits in the 12-bit segment, it is contemplated that only a portion of the bits in the 12-bit segment may participate in the bit-rotation pattern. Combinations of different rotation patterns, different numbers of bits and different portions of bits may also be used in conjunction with the stream cipher system 100 to further yield random bit re-ordering, random byte re-ordering and byte rotation, to name a few.

As was previously mentioned, operation of the first random pseudo-number generator 106 is synchronized to operation of the fourth pseudo-random number generator 114 so that operation of the second reversible function device 116 restores, from the decrypted data stream 109, the data stream 111 that is substantially identical to the data stream 103. As was also previously mentioned, operation of the second pseudo-random number generator 108 is synchronized to operation of the third pseudo-random number generator 112 so that operation of the second XOR function 126 restores, from the encrypted data stream 107, the decrypted data stream 109 that is substantially identical to the re-ordered data stream 105. In other words, operation of the third pseudo-random number generator 112 reverses operation of the second pseudo-random number generator 108, and operation of the fourth pseudo-random number generator 114 reverses operation of the first pseudo-random number generator 106, thereby yielding the restored data stream 111 substantially identical to the data stream 103.

As a result of operation of the first and second reversible function devices 110, 116, even if an eavesdropper is able to intercept the encrypted data stream 107, the eavesdropper cannot glean specific data locations within the encrypted data packets nor can the eavesdropper modify the encrypted data stream 107 without such modification being detected by an error detection technique performed by the receiving device. Further, because bits of the encrypted data stream 107 are re-ordered prior to transmission, any eavesdropper modification to the encrypted data stream 107 would yield an incorrect error detection field(s) such as for example, an invalid CRC. Subsequent receiver detection of the error would therefore cause the associated received data to be discarded.

For example, assuming the known-plaintext attack and using knowledge of the underlying communications protocol (e.g., the structure of the data packet, the error detection technique), an eavesdropper seeks and recognizes a data packet of the encrypted data stream 107 having a specific length containing known, fixed data content. Upon XORing the encrypted contents of the data packet with the presumed known, fixed data content as described above, the eavesdropper is left only with a sequence of garbage bits, or an incorrect encryption stream, rather than with the correct encryption stream. Any subsequent encryptions by the eavesdropper using the incorrect encryption stream results in more garbage bits and/or data packets that are rejected by the receiving device.

For example, applying the incorrect encryption stream to a substitute data packet containing malicious contents yields an incorrect CRC and an incorrectly encrypted data stream. Decryption of the incorrectly encrypted data stream via XORing it using one or more numbers from the third random number stream 128 yields a decrypted data stream 109 that is not substantially identical to the re-ordered data stream 105. Further when the reverse function f' is applied to the re-ordered data stream 109, the resulting restored data stream 111 is not substantially identical to the data stream 103. Accordingly, the error detection technique of the receiving device identifies and discards the corrupted data packets resulting from the eavesdropper activity, thereby preventing the damage intended by the eavesdropper.

Figure 3:
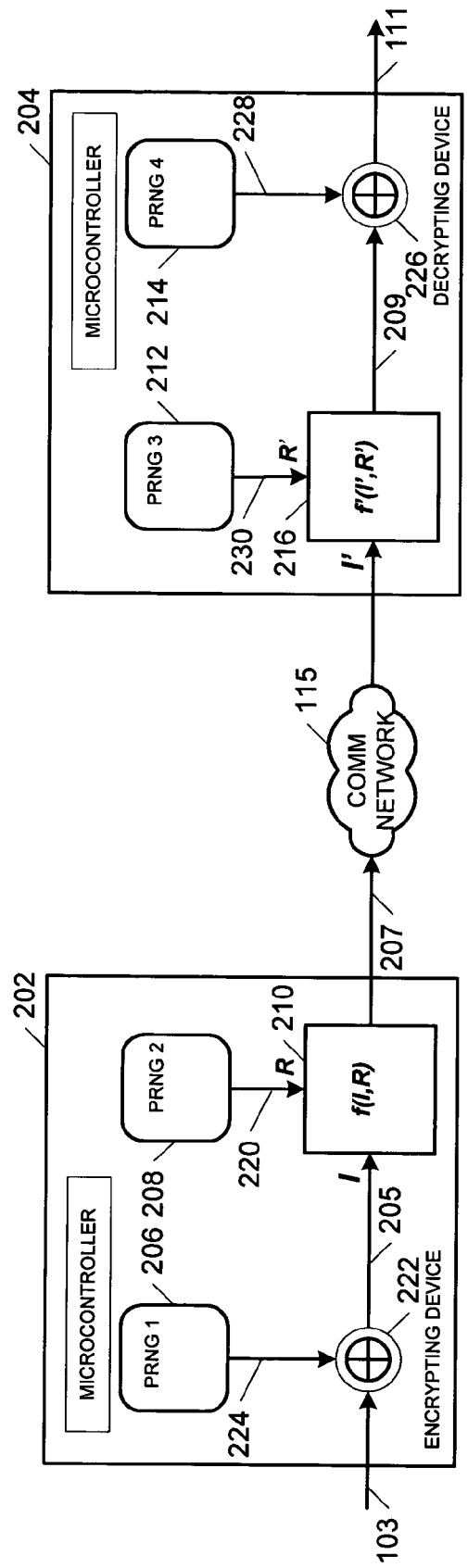
FIG. 3 is another exemplary stream cipher system for encoding and decoding a stream of data according to an embodiment of the invention.

Although re-ordering in both the encrypting and decrypting device is accomplished using pseudo-random number generators, it is contemplated that any symmetric function may be used such as, for example, a hash function, so that operation of the second reversible function device 116 reverses a result from operation of the first reversible function device 110. Further, although configured to first apply the function f to the data stream 103 and then perform the encryption step, it is contemplated that the encrypting device 102 may be configured to first apply the encryption step to the unencrypted data stream 103 and then apply the function f, as long as the decryptor is similarly reverse-configured (see, FIG. 3). It is also contemplated that multiple functions $f$ may be applied to the data stream 103 or the re-ordered data stream 105, and that one pseudo-random number generator could be used for both applying the function $f$ via a first random number stream of the pseudo-random number generator, and applying the encryption via a second random number stream of the pseudo-random number generator, as long as the decrypting device 104 is similarly reverse-configured with one pseudo-random generator generating two random number streams; that is, a second pseudo-random generator generating a third and a fourth random number stream.(see, FIG. 4).

Further, although illustrated using an encrypting device located remotely from a decrypting device via the communication network 115, it is contemplated that the stream cipher system of FIG. 2 may include a pair of serial communication devices separated by the communication network 115, where each serial communication device includes an encrypting device and a decrypting device, controlled by a microcontroller of its respective serial communication device.

Figure 5:
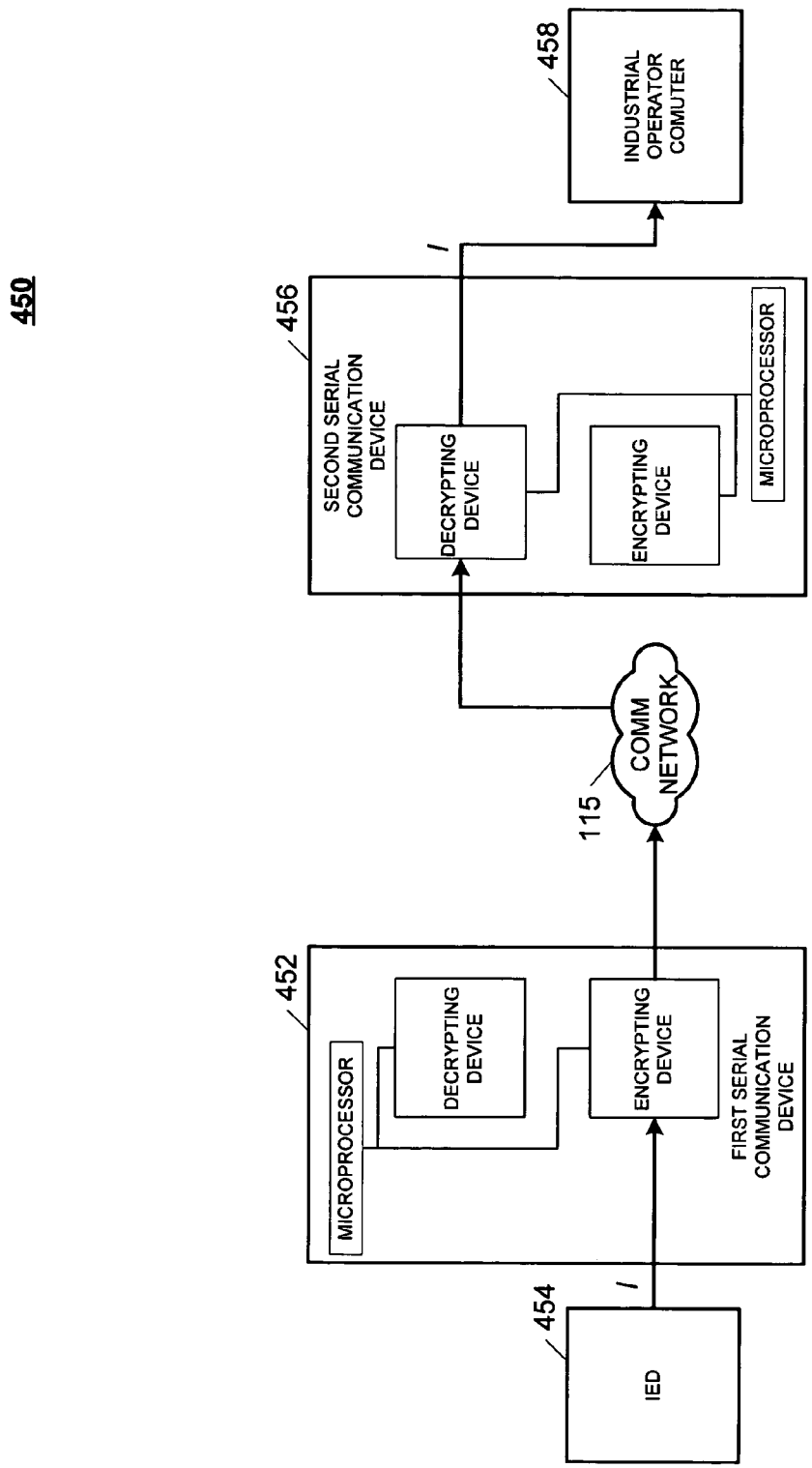
FIG. 5 is system level block diagram of another exemplary stream cipher system for encoding and decoding a stream of data according to an embodiment of the invention.

For example, FIG. 5 is system level block diagram of another exemplary stream cipher system 450 for encoding and decoding a stream of data I according to an embodiment of the invention. Referring to FIG. 5, the exemplary stream cipher system 450 includes a first serial communication device 452 operatively coupled between an intelligent electronic device (IED) 454 (e.g., an electric power meter, a programmable controller, a remote terminal unit (RTU), a communications processor, a protective relay), and the communication network 115 for re-ordering and encrypting a data stream. The first serial communication device 452 includes an encrypting device such as the encrypting device 102 of FIG. 2, coupled to a decrypting device such as the decrypting device 104 of FIG. 2. Unlike the encrypting and decrypting devices of FIG. 2 however, the encrypting and decrypting devices of the first serial communication device 452 preferably do not include individual microcontrollers. Instead, the first serial device 452 further includes a microcontroller operatively coupled to both the encrypting and decrypting devices of the first serial communication device 452. The exemplary stream cipher system 450 also includes a second serial communication device 456 operatively coupled between the communication network 115 and an industrial operator computer 458 for re-ordering and decrypting the data stream for supervisory control and data acquisition system (SCADA system) purposes. In a preferred embodiment, the second serial communication device 456 is substantially identically configured and operable as the first serial communication device 452.

Figure 4:
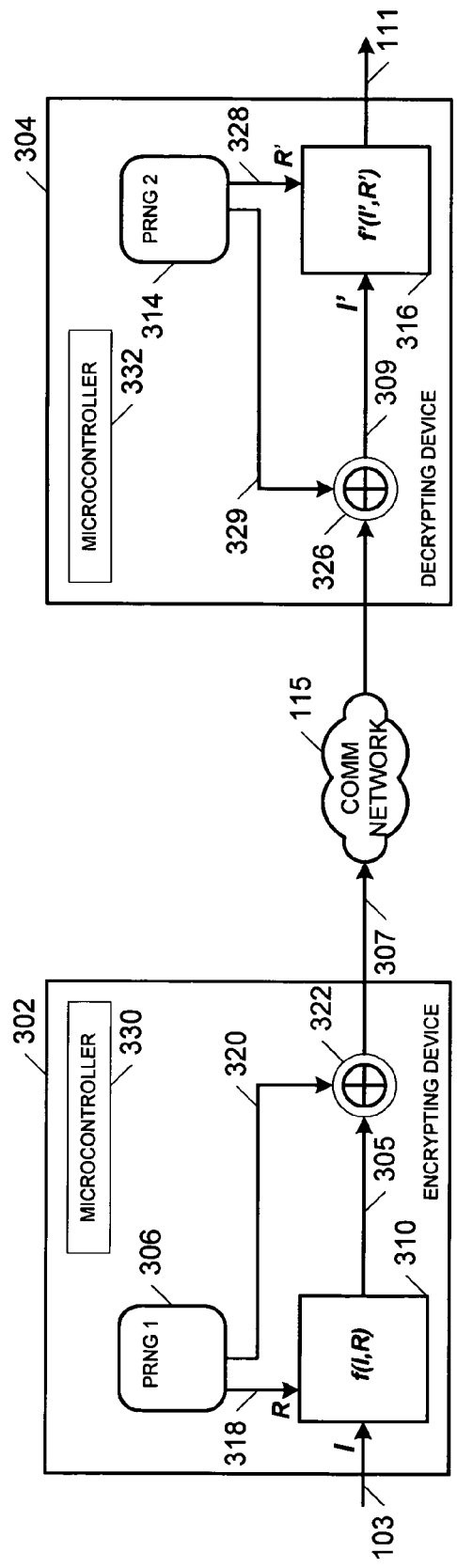
FIG. 4 is yet another exemplary stream cipher system for encoding and decoding a stream of data according to an embodiment of the invention.
Figure 6:
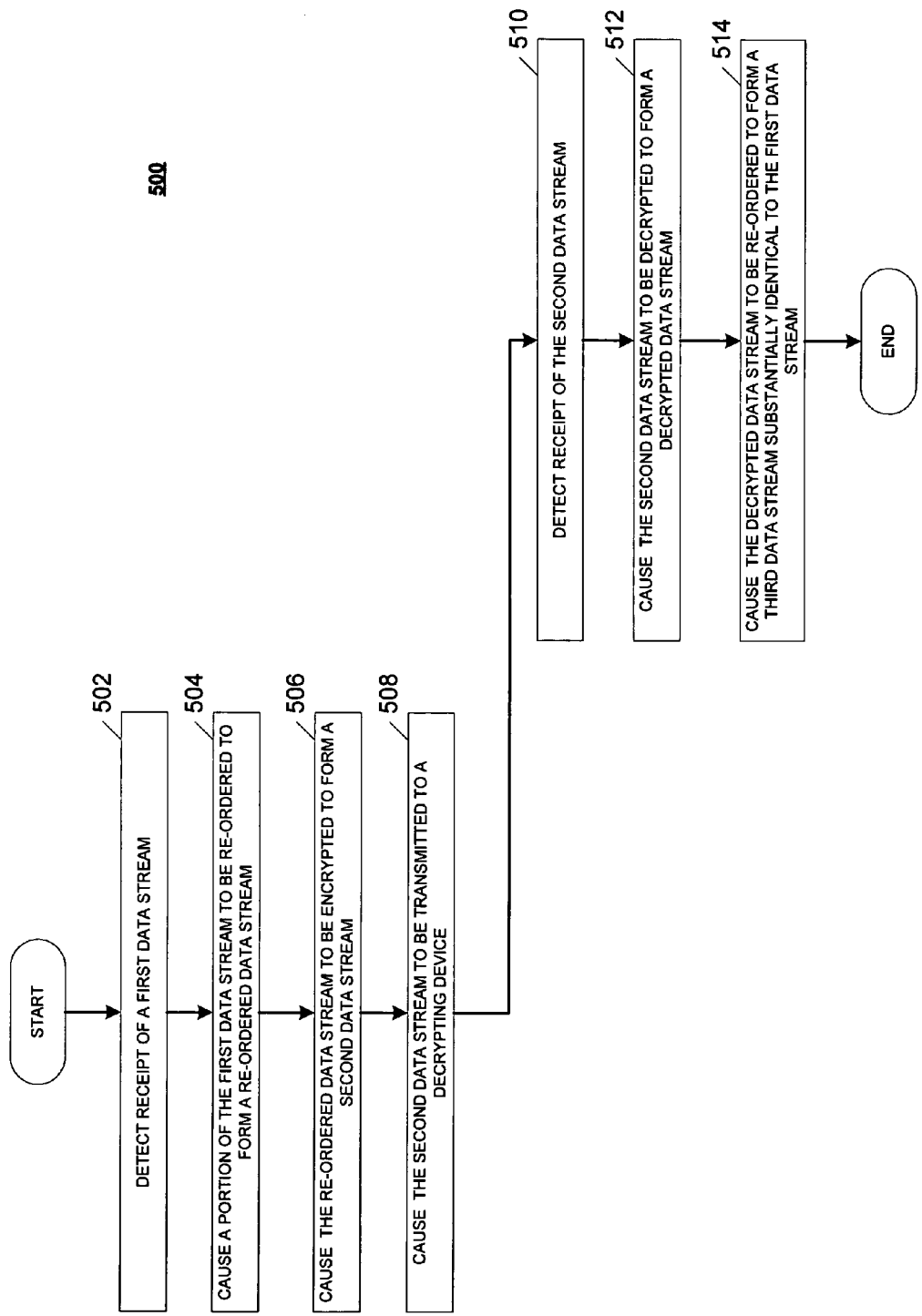
FIG. 6 is a flowchart of a method for optimizing error detection to detect unauthorized modification of transmitted data, according to an embodiment of the invention.

FIG. 6 is a flowchart of a method 500 for optimizing error detection to detect unauthorized modification of data provided by an encrypting device such as the encrypting device 302 of FIG. 4, to a decrypting device such as the decrypting device 304 of FIG. 4. The encrypting device includes a first microcontroller such as the first microcontroller 330 of FIG. 4, where the first microcontroller includes a first microprocessor and a first memory operatively coupled to the first microprocessor, and the decrypting device includes a second microcontroller such as the second microcontroller 332 of FIG. 4, where the second microcontroller includes a second microprocessor and a second memory operatively coupled to the second microprocessor. Each of the first and second microcontrollers 330, 332 are operatively coupled to the elements (e.g. a first pseudo-random number generator 306) of their respective encrypting and decrypting devices 302, 304.

Referring to FIGS. 4 and 6, the method 500 begins when the first microcontroller 330 detects receipt of a first portion of the first data stream 103 (step 502), and causes a first reversible function device 310 of the encrypting device 302 to re-order the first data stream 103 to form a re-ordered data stream 305 (step 504). The first reversible function device 310 is coupled to a first pseudo-random number generator 306 and is responsive to a first random number stream 318 provided by the first pseudo-random number generator 306. The first reversible function device 310 applies a first function, or the function $f$, to the first data stream 103 to form the re-ordered data stream 305. The first function may be a random bit-rotation of a portion of the first data stream 103, where the random bit-rotation is based on at least one number generated by the first random number generator. Alternatively, the first function may be a random bit-reordering, byte re-ordering, or byte rotation, etc., of a portion of the first data stream 103, where the random bit-reordering, byte re-ordering, or byte rotation, etc., is based on at least one number generated by the first random number generator 306.

In order to apply the function $f$, the first microcontroller 330 causes a first present value of the first random number stream 318 to be stored in a register or the memory of the first microcontroller 330. Similarly, the first microcontroller 330 causes a first portion of the data stream 103 to be stored in a register or the memory of the first microcontroller 330. Upon storage completion of the first present value of the first random number stream 318 and the first portion of the data stream 103, the first microcontroller 330 begins storage of a second present value of the first random number stream 318 and a second portion of the data stream 103. Concurrently, the first microcontroller 330 causes at least one bit of the first portion of the data stream 103 to be re-ordered based on the first present value of the first random number stream 318 to form a first portion of the re-ordered data stream 305. The steps of saving and re-ordering similarly continue on subsequent portions of the data stream 103.

Next, the first microcontroller 330 causes a first XOR function 322 of the encrypting device 302 to encrypt the re-ordered data stream 305 to form a second data stream 307 (step 506), and causes the second data stream 307 to be transmitted to the decrypting device (step 508). As illustrated, the first XOR function 322 is coupled to the first pseudo-random number generator 306 and is responsive to a second random number stream 320 generated by the first pseudo-random number generator 306 to encrypt the re-ordered data stream 305 to form the second data stream 307.

Upon detecting receipt of the second data stream 307 (step 510), the second microcontroller 332 causes a second XOR function 326 of the decrypting device 304 to decrypt the second data stream 307 to form a decrypted data stream 309 (step 512). As illustrated, the second XOR function 326 is coupled to a second pseudo-random number generator 314 and is responsive to a third random number stream 329 generated by the second pseudo-random number generator 314 to decrypt the second data stream 307 to form the decrypted data stream 309.

Next, the second microcontroller 332 causes a second reversible function device 316 of the decrypting device 304 to re-order the decrypted data stream 309 to form a third data stream 111 that is substantially identical to the first data stream 103 (step 514). The second reversible function device 316 applies a second function, or the reverse function $f'$, to the decrypted data stream 309 to form the third data stream 111, where application of the second function reverses results from application of the first function. As illustrated, the second reversible function device 316 is coupled to the second pseudo-random generator and is responsive to a fourth random number stream 328 generated by the second pseudo-random number generator 314 to re-order the decrypted data stream 309 to form the third data stream 111. Further, operation of the first pseudo-random number generator 306 is synchronized to operation of the second pseudo-random number generator 314.

In order to apply the reverse function f', the second microcontroller 332 causes a first present value of the fourth random number stream 328 to be stored in a register or memory of the second microcontroller 332. Similarly, the second microcontroller 332 causes a first portion of the decrypted data stream 309 to be stored in the register or the memory. Upon storage completion of the first present value of the fourth random number stream 328 and the first portion of the decrypted data stream 309, the second microcontroller 332 begins storage of a second present value of the fourth random number stream 328 and a second portion of the decrypted data stream 309. Concurrently, the second microcontroller 332 causes at least one bit of the first portion of the decrypted data stream 309 to be re-ordered based on the first present value of the fourth random number stream 328 to form a first portion of the third data stream 111. The steps of saving and re-ordering similarly continue on subsequent portions of the decrypted data stream 309. In this way, error detection is optimized such that unauthorized transmitted data modification by an eavesdropper is detected and associated corrupted data discarded at the receiving end, thereby preventing the would-be system damage intended by eavesdropper.

The present invention has been described in part by reference to block diagrams, flow diagrams and elements of systems and steps of methods. As is well known, suitable program instructions or coding provided in software are used to turn general purpose computers and/or processors into programmed computers and/or processors to form systems capable of carrying out a specific application, such as the teachings of the present invention.

As will also be appreciated by those skilled in the art, the software or other coding employed to implement the present invention may be provided in any suitable form of computer program code embodied in tangible media, such as but not limited to floppy diskettes, CD-ROMs, hard drives, static or flash memory, or any other computer readable storage medium. When such computer program code or other code, containing the needed instructions, is loaded into and is ready for execution by suitable computers/processors/microcontrollers, such programmed computers/processors/microcontrollers become an apparatus for practicing the invention. Thus, it should be appreciated that another embodiment of the present invention is the computer program code needed for carrying out the processes of the present invention when it is embodied in a tangible medium.

While particular embodiments of the invention have been shown and described, it will be obvious to those skilled in the art that changes and modifications may be made therein without departing from the invention in its broader aspects.

It is claimed:

1. A system for optimizing error detection to detect unauthorized modification of transmitted data, the system comprising:
   a first encrypting device including:
      a first pseudo-random number generator;
      a second pseudo-random number generator;
      a first reversible function device operatively coupled to and responsive to the first pseudo-random number generator to re-order the first data stream to form a re-ordered data stream; and,
      a first XOR function operatively coupled to and responsive to the second pseudo-random number generator to encrypt the re-ordered data stream to form a second data steam; and,
   a first decrypting device operatively coupled to the first encrypting device, the first decrypting device configured to perform a re-ordering step and a decrypting step to the second data stream to form a third data stream substantially identical to the first data stream.

2. The system of claim 1, wherein the first decrypting device comprises:
   a third pseudo-random number generator;
   a fourth pseudo-random number generator;
   a second XOR function operatively coupled to and responsive to the third pseudo-random number generator to decrypt the second stream to form a decrypted data stream; and
   a second reversible function device operatively coupled to and responsive to the fourth pseudo-random number generator to re-order the decrypted data stream to form the third data stream.

3. The system of claim 2, wherein operation of the first pseudo-random number generator is synchronized to operation of the fourth pseudo-random number generator, and wherein operation of the second pseudo-random number generator is synchronized to operation of the third pseudo-random number generator.

4. The system of claim 2, wherein the first encrypting device further comprises a first microcontroller having a first microprocessor and a first memory operatively coupled to the first microprocessor, and wherein the decrypting device further comprises a second microcontroller having a second microprocessor and a second memory operatively coupled to the second microprocessor.

5. The system of claim 4, further comprising a second decrypting device operatively coupled to the first microcontroller, the first encrypting device and the second decrypting device and the first microcontroller adapted to form a first serial communication device.

6. The system of claim 5, further comprising a second encrypting device operatively coupled to the second microcontroller, the second encrypting device and the first decrypting device and the second microcontroller adapted to form a second serial communication device, the second serial communication device coupled to the first serial communication device via a communication network.

7. The system of claim 2, wherein the first reversible function device is configured to apply a first function to the first data stream to form the re-ordered data stream, wherein the second reversible function device is configured to apply a second function to the decrypted data stream to form the third data stream, and wherein application of the second function reverses a result from application of the first function.

8. The system of claim 7, wherein the first function comprises a random bit-rotation of at least one bit of a portion of the first data stream, the random bit-rotation based on at least one number generated by the first random number generator.

9. The system of claim 7, wherein the first function comprises a random bit-reordering of at least one bit of a portion of the first data stream, the random bit-reordering based on at least one number generated by the first random number generator.

10. A system for optimizing error detection to detect unauthorized modification of transmitted data, the system comprising:

a first encrypting device, including:
a first pseudo-random number generator;
a first reversible function device operatively coupled to and responsive to the first pseudo-random number generator;
a second pseudo-random number generator;
a first XOR function operatively coupled to and responsive to the second pseudo-random number generator to encrypt the first data stream to form an encrypted data stream; and
the first reversible function device to re-order the encrypted data stream to form the second data steam; and,
a first decrypting device operatively coupled to the first encrypting device, the first decrypting device configured to perform a re-ordering step and a decrypting step to the second data stream to from a third data stream substantially identical to the first data stream.

11. The system of claim 10, wherein the first decrypting device comprises:
a third pseudo-random number generator;
a fourth pseudo-random number generator;
a second reversible function device operatively coupled to and responsive to the third pseudo-random number generator to re-order the second data stream to form a re-ordered data stream; and
a second XOR function operatively coupled to and responsive to the fourth pseudo-random number generator to decrypt the re-ordered data stream to form the third data stream.

12. The system of claim 11, further comprising:
a first microcontroller operatively coupled to the first encrypting device; and
a second decrypting device operatively coupled to the first microcontroller, the first encrypting device and the second decrypting device and the first microcontroller adapted to form a first serial communication device.

13. The system of claim 12, further comprising:
a second microcontroller operatively coupled to the first decrypting device; and
a second encrypting device operatively coupled to the second microcontroller, the second encrypting device and the first decrypting device and the second microcontroller adapted to form a second serial communication device, the second serial communication device operatively coupled to the first serial communication device via a communication network.

14. A system for optimizing error detection to detect unauthorized modification of transmitted data, the system comprising:
a first encrypting device including:
a first pseudo-random number generator;
a first reversible function device operatively coupled to the first pseudo-random number generator and responsive to a first random number stream generated by the first pseudo-random number generator to re-order the first data stream to form a re-ordered data stream;
a first XOR function operatively coupled to the first pseudo-random number generator and responsive to a second random number stream generated by the first pseudo-random number generator to encrypt the re-ordered data stream to form the second data steam; and,
a first decrypting device operatively coupled to the first encrypting device, the first decrypting device configured to perform a re-ordering step and a decrypting step to the second data stream to form a third data stream substantially identical to the first data stream.

15. The system of claim 14, wherein the first decrypting device comprises:
a second pseudo-random number generator;
a second XOR function operatively coupled to the second pseudo-random number generator and responsive to a third random number stream generated by the second pseudo-random number generator to decrypt the second data stream to form a decrypted data stream; and
a second reversible function device operatively coupled to the second pseudo-random number generator and responsive to a fourth random number stream generated by the second pseudo-random number generator to re-order the decrypted data stream to form the third data stream.

16. The system of claim 15, wherein the first encrypting device further comprises a first microcontroller having a first microprocessor and a first memory operatively coupled to the first microprocessor, and wherein the decrypting device further comprises a second microcontroller having a second microprocessor and a second memory operatively coupled to the second microprocessor.

17. The system of claim 16, further comprising a second decrypting device operatively coupled to the first microcontroller, the first encrypting device and the second decrypting device and the first microcontroller adapted to form a first serial communication device.

18. The system of claim 17, further comprising a second encrypting device operatively coupled to the second microcontroller, the second encrypting device and the first decrypting device and the second microcontroller adapted to form a second serial communication device, the second serial communication device coupled to the first serial communication device via a communication network.

19. The system of claim 15, wherein operation of the first pseudo-random number generator is synchronized to operation of the second pseudo-random number generator.

20. The system of claim 15, wherein the first reversible function device is configured to apply a first function to the first data stream to form the re-ordered data stream, wherein the second reversible function device is configured to apply a second function to the decrypted data stream to form the third data stream, and wherein application of the second function reverses a result from application of the first function.

21. The system of claim 20, wherein the first function comprises a random bit-rotation of at least one bit of a portion of the first data stream, the random bit-rotation based on at least one number generated by the first random number generator.

22. The system of claim 20, wherein the first function comprises a random bit-reordering of at least one bit of a portion of the first data stream, the random bit-reordering based on at least one number generated by the first random number generator.

23. A method for optimizing error detection to detect modification of data provided by an encrypting device to a decrypting device, the encrypting device including a first microcontroller having a first microprocessor and a first memory operatively coupled to the first microprocessor, the decrypting device including a second microcontroller having a second microprocessor and a second memory operatively coupled to the second microprocessor, the method comprising:
causing the encrypting device to:
perform a re-ordering step using a first pseudo-random number generator and a first reversible function device operatively coupled to the first pseudo-random number generator and responsive to a first random number stream generated by the first pseudo-random number generator;

perform an encrypting step to a first data stream using a first XOR function coupled to the first pseudo-random number generator and responsive to a second random number stream generated by the first pseudo-random number generator of the encrypting device to form a second data stream; and causing the decrypting device to perform a decrypting step and a re-ordering step to the second data stream to form a third data stream substantially identical to the first data stream.

24. The method of claim 23, wherein causing the decrypting device to decrypt and re-order the second data stream comprises: causing a second XOR function of the decrypting device to decrypt the second data stream to form a decrypted data stream; and causing a second reversible function device of the decrypting device to re-order the decrypted data stream to form the third data stream.

25. The method of claim 24, wherein the second XOR function is coupled to a second pseudo-random number generator of the decrypting device and responsive to third random number stream generated by the second pseudo-random number generator, and wherein the second reversible function device is coupled to second pseudo-random number generator and responsive to a fourth random number stream generated by the second pseudo-random number generator.

26. The method of claim 25, wherein operation of the first pseudo-random number generator is synchronized to operation of the second pseudo-random number generator.

27. The method of claim 25, further comprising:
causing the first reversible function device to apply a first function to the first data stream to form the re-ordered data stream; and
causing the second reversible function device to apply a second function to the decrypted data stream to form the third data stream,
wherein application of the second function reverses application of the first function.

28. The method of claim 27, wherein the first function comprises a random bit-rotation of at least one bit of a portion of the first data stream, the random bit-rotation based on at least one number generated by the first random number generator.

29. The method of claim 27, wherein the first function comprises a random bit-reordering at least one bit of a portion of the first data stream, the random bit-reordering based on at least one number generated by the first random number generator.

30. A method for optimizing error detection to detect modification of data provided by an encrypting device to a decrypting device, the encrypting device including a first microcontroller having a first microprocessor and a first memory operatively coupled to the first microprocessor, the decrypting device including a second microcontroller having a second microprocessor and a second memory operatively coupled to the second microprocessor, the method comprising:

causing the encrypting device to perform a re-ordering step and perform an encrypting step to a first data stream to form a second data stream; including,
causing a first reversible function device of the encrypting device to re-order the first data stream to form a re-ordered data stream, the first reversible function device coupled to and responsive to a first pseudo-random number generator of the encrypting device; and causing a first XOR function of the encrypting device to encrypt the re-ordered data stream to form the second data stream, the first XOR function coupled to and responsive to a second pseudo-random number generator of the encrypting device; and, causing the decrypting device to perform a decrypting step and a re-ordering step to the second data stream to form a third data stream substantially identical to the first data stream.

31. The method of claim 30, wherein causing the decrypting device to decrypt and re-order the second data stream comprises:

causing a second XOR function of the decrypting device to decrypt the second data stream to form a decrypted data stream, the second XOR function coupled to and responsive to a third pseudo-random number generator of the decrypting device; and causing a second reversible function device of the decrypting device to re-order the decrypted data stream to form the third data stream, the second reversible function device coupled to and responsive to a fourth pseudo-random number generator of the encrypting device.

32. The method of claim 31, wherein operation of the first pseudo-random number generator is synchronized to operation of the fourth pseudo-random number generator, and wherein operation of the second pseudo-random number generator is synchronized to operation of the third pseudo-random number generator.

33. A method for optimizing error detection to detect modification of data provided by an encrypting device to a decrypting device, the encrypting device including a first microcontroller having a first microprocessor and a first memory operatively coupled to the first microprocessor, the decrypting device including a second microcontroller having a second microprocessor and a second memory operatively coupled to the second microprocessor, the method comprising:

causing the encrypting device to perform a re-ordering step and perform an encrypting step to a first data stream to form a second data stream, including:
causing a first XOR function of the encrypting device to encrypt the first data stream to form an encrypted data stream, the first XOR function coupled to and responsive to a first pseudo-random number generator of the encrypting device; and causing the first reversible function device of the encrypting device to re-order the encrypted data stream to form the second data stream, the first reversible function device coupled to and responsive to a second pseudo-random number generator of the encrypting device; and causing the decrypting device to perform a decrypting step and a re-ordering step to the second data stream to form a third data stream substantially identical to the first data stream.

34. The method of claim 33, wherein causing the decrypting device to decrypt and re-order the second data stream comprises:

causing a second reversible function device of the decrypting device to re-order the second data stream to form a re-ordered data stream, the second reversible function device coupled to and responsive to a third pseudo-random number generator of the encrypting device; and causing a second XOR function of the decrypting device to decrypt the re-ordered data stream to form the third stream, the second XOR function coupled to and responsive to a fourth pseudo-random number generator of the decrypting device.

* * * * *